United States Patent
Iwaji et al.

(10) Patent No.: US 7,859,209 B2
(45) Date of Patent: Dec. 28, 2010

(54) CONTROL DEVICE FOR SYNCHRONOUS MOTOR

(75) Inventors: Yoshitaka Iwaji, Hitachinaka (JP);
Yasuhiko Kokami, Takasaki (JP);
Minoru Kurosawa, Yoshii (JP);
Junnosuke Nakatsugawa, Hitachi (JP)

(73) Assignee: Renesas Electronics Corporation, Tokyo (JP)

( * ) Notice: Subject to any disclaimer, the term of this patent is extended or adjusted under 35 U.S.C. 154(b) by 401 days.

(21) Appl. No.: 11/895,406

(22) Filed: Aug. 23, 2007

(65) Prior Publication Data

US 2008/0061726 A1   Mar. 13, 2008

(30) Foreign Application Priority Data

Aug. 23, 2006   (JP)   ............... 2006-226315

(51) Int. Cl.
*H02P 6/10*   (2006.01)
(52) U.S. Cl. ............... 318/400.23; 318/400.14; 318/609; 318/702
(58) Field of Classification Search ........ 318/700, 318/720–724, 400.14, 437, 400.23, 400.24, 318/609, 610, 619, 702
See application file for complete search history.

(56) References Cited

U.S. PATENT DOCUMENTS

| 5,250,887 | A  | * | 10/1993 | Kurosawa ............... 318/610 |
| 5,710,500 | A  | * | 1/1998  | Matsuo et al. ........... 318/799 |
| 6,597,146 | B1 | * | 7/2003  | Rehm et al. ............. 318/632 |
| 6,734,649 | B1 | * | 5/2004  | Sardar .................. 318/609 |
| 7,240,761 | B2 | * | 7/2007  | Nagase et al. ........... 180/443 |
| 7,345,443 | B2 | * | 3/2008  | Yoshiura et al. ......... 318/432 |

FOREIGN PATENT DOCUMENTS

| JP | 11-103588   | 4/1999  |
| JP | 2001-352789 | 12/2001 |
| JP | 2005-102447 | 4/2005  |

* cited by examiner

*Primary Examiner*—Bentsu Ro
(74) *Attorney, Agent, or Firm*—Townsend and Townsend and Crew LLP

(57) ABSTRACT

A control technology for a synchronous motor for suppressing rotational pulsation caused by variation in individuals without making a control algorithm complex is provided. In a motor drive system which is a control device for a synchronous motor, in order to suppress the pulsation component of N times as high as the AC frequency for driving the synchronous motor, a controller in which the phase property of the disturbance response of the controller with respect to the pulsation frequency is within ±45° is arranged. Therefore, the torque pulsation component generated from distortion in induction voltage or variation between phases is suppressed.

8 Claims, 7 Drawing Sheets

CONTROL DEVICE FOR SYNCHRONOUS MOTOR

CROSS-REFERENCE TO RELATED APPLICATION

The present application claims priority from Japanese Patent Application No. JP 2006-226315 filed on Aug. 23, 2006, the content of which is hereby incorporated by reference into this application.

TECHNICAL FIELD OF THE INVENTION

The present invention relates to a control technology for a synchronous motor. More particularly, the present invention relates to a technology effective when used in a rotation control technology for a spindle motor of hard disc driver (HDD), optical disc driver and the like in a motor driving device and a motor driver integrated circuit device.

BACKGROUND OF THE INVENTION

For example, in the drive system of spindle motors of HDD devices, reduction in rotational pulsation is strongly desired. If the rotational pulsation is large, read or write error occurs, which becomes a great impediment in enhancing the recording density. Furthermore, the rotational pulsation is preferably as small as possible to reduce the noise that HDD devices generate.

Accordingly, in recent years, a technology to make a waveform of driving current of the motor to an ideal sinusoidal current has been the mainstream (e.g., Japanese Patent Application Laid-Open Publication No. 2005-102447 (Patent Document 1)). In principle, the rotational pulsation can be suppressed by driving the motor by sinusoidal current.

Further, as Driving methods which suppress the rotational pulsation itself, a method of tabling a pulsation pattern in advance and correcting the same (e.g., Japanese Patent Application Laid-Open Publication No. 11-103588 (Patent Document 2)), a method of estimation calculating a disturbance torque component, which is a factor of pulsation, with an observer and performing a control to cancel such disturbance torque component (e.g., Japanese Patent Application Laid-Open Publication No. 2001-352789 (Patent Document 3)), and the like have been proposed.

SUMMARY OF THE INVENTION

Meanwhile, in the driving methods described above, in principle, the pulsation component may become zero by making the driving waveform of the motor to a sinusoidal waveform. In reality, however, the pulsation component is sometimes generated due to characteristics of the motor itself.

A first factor is an induction voltage generated inside the motor itself being distorted. This may posed by a stator or a rotor configuration of the motor and winding manners (distributed winding/concentrated winding) of the coil. In these cases, distortion components are generated even if a sinusoidal voltage is applied, thereby causing rotational pulsations. In the pulsation components in these cases, a sixth frequency component is generated with respect to the driving frequency.

A second factor originates from manufacturing variation. As manufacturing cost of the motor is cut-down, the manufacturing accuracy itself is lowered, and in consequence, variations occur between phases. If variations exist in the three-phase windings, secondary harmonic pulsation components are generated, thereby posing a large rotational pulsation.

In order to suppress such secondary or sixth pulsation component, the waveform of the driving voltage is intentionally deformed to suppress such components in Patent Document 1. In Patent Document 2, the rotational pulsation is suppressed by storing the pulsation components in advance, and flowing current capable of cancelling such pulsation. In either case, it is necessary to investigate what kind of distortion is generated in advance. In these methods, it is difficult to resolve variations of motor individuals when realizing a driver with a dedicated integrated circuit. A learning function may be provided to the driver itself, but in this case, the scale of the integrated circuit may be greatly increased, and at the same time, complex control process must be installed.

Moreover, it is possible to resolve Individual variation as long as it is a method of observing the disturbance itself with the observer and suppressing the disturbance as in Patent Document 3. However, also in such method, its control algorithm is complex and the scale of the integrated circuit is greatly increased.

In view of such problems, an object of the present invention is to provide a control technology of a synchronous motor capable of suppressing rotational pulsations caused by individual variation without getting complexity to the control algorithm.

The above and other objects and novel characteristics of the present invention will be apparent from the description of this specification and the accompanying drawings.

The typical ones of the inventions disclosed in this application will be briefly described as follows.

To suppress a pulsation component N times as high as an AC frequency for driving a synchronous motor, the present invention provides a controller which has the phase property of disturbance response with respect to the pulsation frequency within ±45°, so that a torque pulsation component generated by distortion of induction voltage or variation between phases is suppressed.

In other words, the torque pulsation component generated by distortion of the induction voltage or variation between phases is considered as distortion of motional electromotive voltage for the pulsation source. Thus, the present invention clarifies the relationship between the current pulsation subjected to influence and the torque pulsation with respect to the fluctuation in the motional electromotive voltage, and adjusts the setting of the current control gain to suppress the torque pulsation.

The effects obtained by typical aspects of the present invention will be briefly described below.

According to the present invention, the pulsation component can be suppressed only with an adjustment process of the current control gain without making the control configuration complex. It is not necessary to acquire the waveform information (phase, amplitude, etc.) of the pulsation component in advance which is needed in the conventional system, and the torque pulsation can be minimized only with the frequency information. In other words, the pulsation of the component is minimized by setting only the frequency of pulsation component required to be minimized, and fine tuning for every individual is unnecessary.

According to the present invention, the system itself is simple and is very effective in achieving specific IC.

BRIEF DESCRIPTIONS OF THE DRAWINGS

Figure 11:
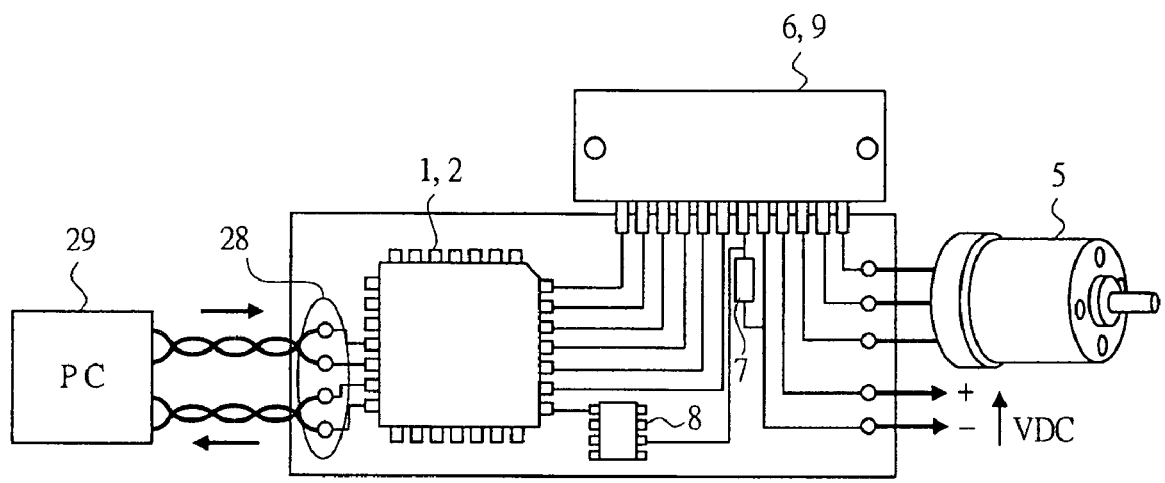
Figure 12:
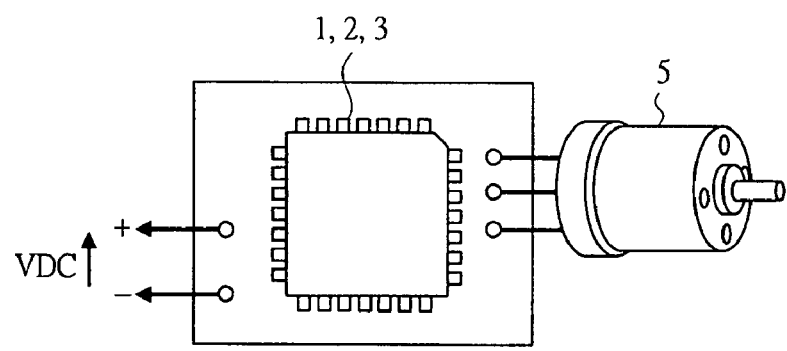

FIG. 11 is a view realistically showing a configuration of a controller in the motor drive system according to a fifth embodiment of the control device for a synchronous motor of the present invention; and FIG. 12 is a view realistically showing a configuration of a controller in the motor drive system according to a sixth embodiment of the control device for a synchronous motor of the present invention.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

Outline of Embodiments of the Present Invention

The present invention is applied to a control device for a synchronous motor including: a synchronous motor; a load device connected to the synchronous motor; an inverter for applying a voltage with modulated pulse width to the synchronous motor and driving the same with an alternating current; a direct-current power supply for supplying power to the inverter; and a controller comprising a means for detecting at least one of current flowing through the synchronous motor or current supplied to the inverter for adjusting the voltage output by the inverter based on the detected current value. Respective embodiments will be specifically described below. Note that, in each figure, "*" denotes a command.

First Embodiment

A motor drive system according to a first embodiment of the control device for a synchronous motor of the present invention will be described with reference to FIG. 1 to FIG. 6.

Figure 1:
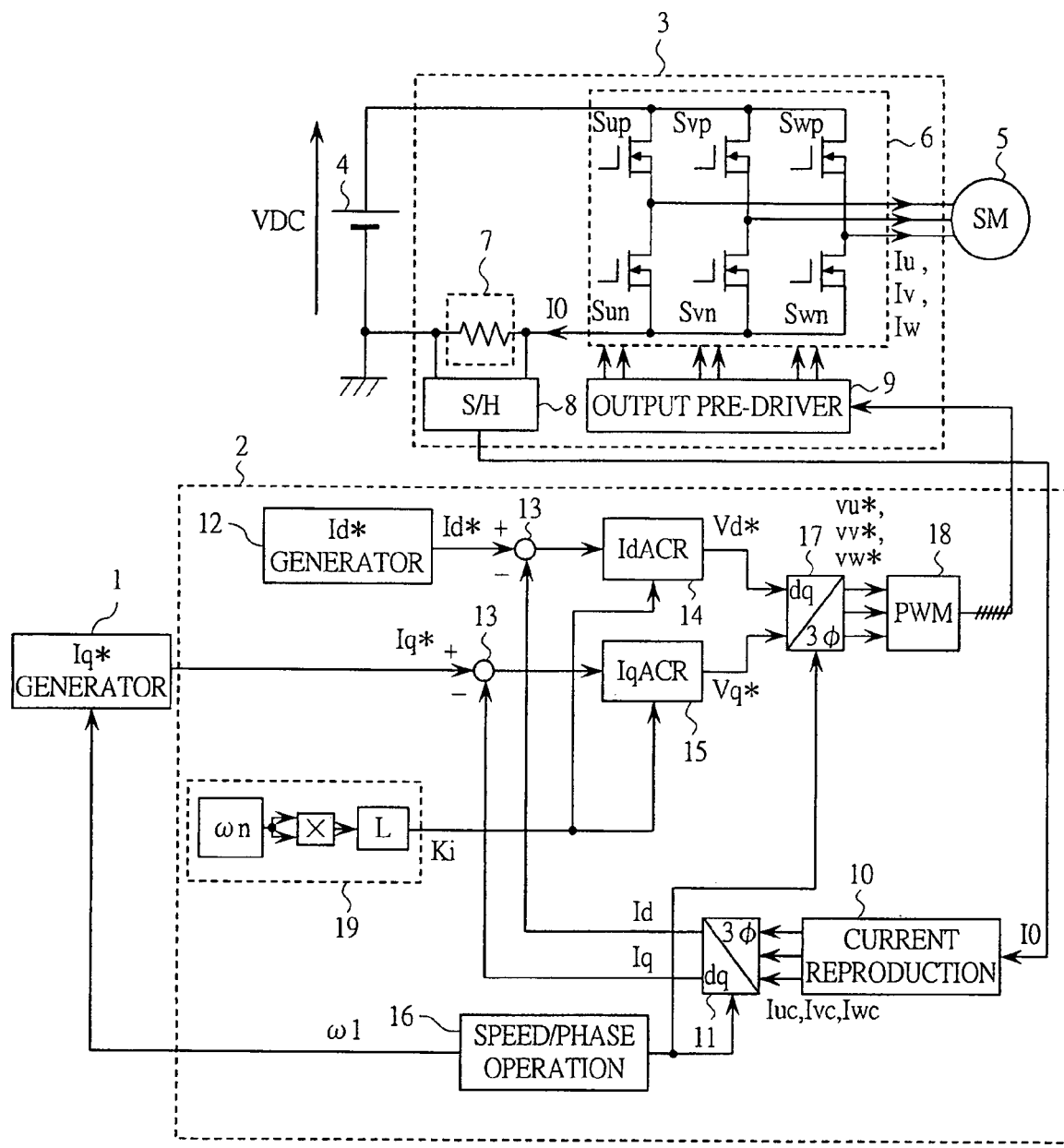
FIG. 1 is a view showing a configuration of a motor drive system according to a first embodiment of a control device for a synchronous motor of the present invention.

FIG. 1 shows a configuration of the motor drive system according to the present embodiment. The motor drive system shown in FIG. 1 is configured by: an Iq* generator 1 for generating a current command corresponding to the torque of the motor: a controller 2 for calculating an applied voltage to the motor and generating a pulse-width modulated wave (PWM) signal for an inverter; the inverter 3 for generating an alternating current voltage from a direct current voltage in response to the PWM signal from the controller 2; a DC power supply 4 which is the power supply of the inverter 3; and a synchronous motor 5 controlled by these components. A load device (not shown) is connected to the synchronous motor 5.

The inverter 3 is configured by: an inverter main circuit unit 6 configured by six switching elements Sup to Swn; a one-shunt current detector 7 for detecting a supply current 10 to the inverter main circuit unit 6; a sample holder 8 for sample-holding the voltage at both ends of the one-shunt current detector 7; and an output pre-driver 9 for directly driving the inverter main circuit unit 6.

The Iq* generator 1 generates a current command Iq* corresponding to the torque current of the motor. The Iq* generator 1 is a controller positioned at a higher order of the controller 2. The controller 2 operates so that the motor generates the torque corresponding to the command Iq*.

The controller 2 includes: the one-shunt current detector 7 for detecting the inverter current; a current reproducer 10 for reproducing the phase current of the motor from the inverter detection current; a dq converter 11 for converting Iuc, Ivc, Iwc which are the phase-current detection values of the motor to values Id, Iq on a dq coordinate which is a rotation coordinate axis; an Id* generator 12 for generating a command of a d-axis current; a subtractor 13 for calculating the deviation between the current commands Id*, Iq* and the detection values Id, Iq; a d-axis current controller 14 and a q-axis current controller 15 for calculating voltage commands Vd*, Vq* on the dq coordinate axis based on the current deviation; a speed and phase operator 16 for operating the number of rotations and rotational phase angle of the synchronous motor; a dq inverse converter 17 for converting the voltage commands Vd*, Vq* on the dq coordinate onto a three-phase alternating current coordinate; a PWM generator 18 for generating a pulse-width modulated signal that turns ON/OFF the inverter main circuit unit 6 based on the three-phase AC voltage commands vu*, vv*, vw*; and an integral gain setting unit 19 for setting the gain of the integral controller used in current control.

Next, the basic operation of the motor drive system of the present embodiment will be described.

As apparent from FIG. 1, the motor drive system of the present embodiment is based on the vector control technology of synchronous motors. The vector control technology is generally known as a control method for linearizing the torque of the synchronous motor, which is an AC motor. The principle lies in the method for independently controlling the current Iq contributing to the torque and the current Id contributing to the magnetic flux on the rotation coordinate referencing the rotor position of the motor, and the configuration of FIG. 1 is mainly used.

Figure 2:
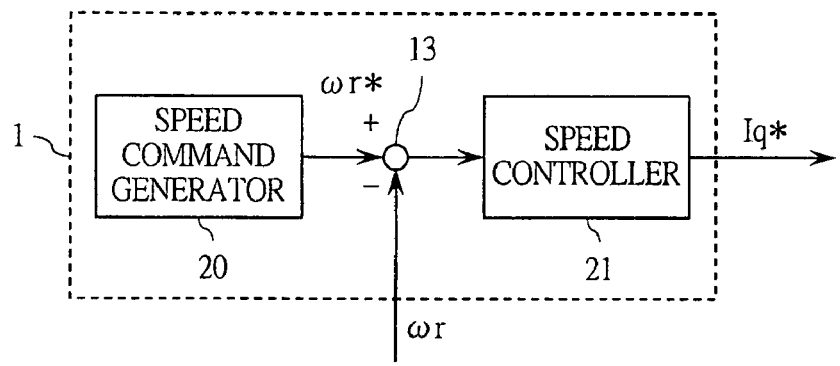
FIG. 2 is a view showing a configuration of an Iq* generator in the motor drive system according to the first embodiment of the control device for a synchronous motor of the present invention.

In FIG. 1, the current command Iq* corresponding to the torque current is calculated in the Iq* generator 1, and current control is performed such that the Iq* and the actual torque current Iq of the synchronous motor 5 match. The Iq* generator 1 uses the configuration shown in FIG. 2. In FIG. 2, a rotation number command ωr* of the synchronous motor 5 is provided from the speed command generator 20, and the deviation of such ωr* and the actual rotation number ωr is calculated in the subtractor 13, where the torque current command Iq* is calculated in the speed controller 21 with the deviation as the input. The synchronous motor 5 is driven at the desired rotation speed ωr* by using the Iq* generator of FIG. 2.

Next, the operation of the current controller (d-axis current controller 14, q-axis current controller 15) and the integral gain setting unit 19 which are characterizing portions of the present embodiment will be described.

Figure 3:
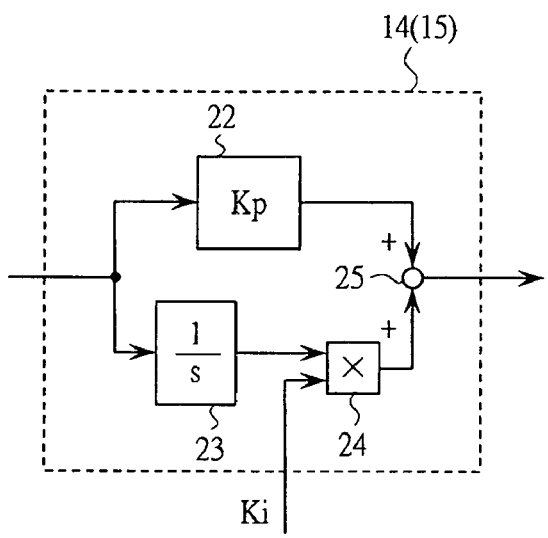
FIG. 3 is a view showing a configuration of a current controller in the motor drive system according to the first embodiment of the control device for a synchronous motor of the present invention.

The d-axis current controller 14 (and the q-axis current controller 15) has a configuration of FIG. 3, where a proportional-integral control (PI control) is adopted. The current controller of FIG. 3 includes: a proportional compensator 22 having the gain as Kp; as well as an integrator 23; a multiplier 24; and an adder 25. The integral compensation differs from that of the usual integral compensator, and the integral gain is determined by the gain set value Ki from the external. The feature of the present embodiment lies in the setting method for setting the integral gain.

First, torque pulsation generated by the synchronous motor will be briefly described.

Figure 4:
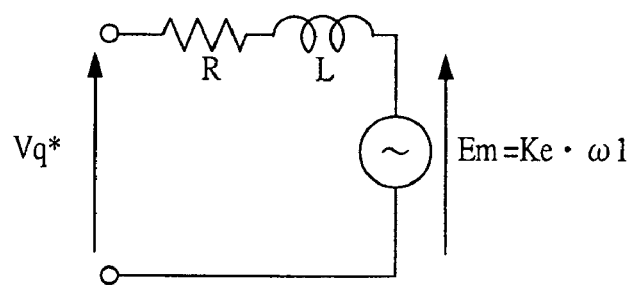
FIG. 4 is a view showing an equivalent circuit of a synchronous motor of permanent magnet type in the motor drive system according to the first embodiment of the control device for a synchronous motor of the present invention.

An equivalent circuit for one phase of the synchronous motor is as shown in FIG. 4. In FIG. 4, Em is an induction voltage of the synchronous motor, and is generated as a product of the driving frequency ω1 (equivalent value to electric angular frequency of rotation speed) and a power generation constant Ke. R and L in FIG. 4 are winding resistance R and inductance L of the synchronous motor.

Assuming that a pulsation component is contained in the induction voltage Ke as a factor of rotational pulsation of the synchronous motor. Ke is represented by Equation 2

$$Ke = Ke0 + \Delta Ke \quad \text{(Eq. 2)}$$

where Ke0 is the average value of the power generation constant, and ΔKe is the pulsation component of the power generation constant. ΔKe is caused by the structure (slot shape, rotor shape, number of poles, etc.) of the motor or by the manufacturing variation, and is generated as sixth or secondary harmonic with respect to the electric angular frequency.

The influence of ΔKe appears as fluctuation of the induction voltage. The induction voltage is represented by Equation 3

$$Em = Em0 + \Delta Em \quad \text{(Eq. 3)}$$

where Em0 is the average value of the induction voltage, and ΔEm is the pulsation component of the induction voltage. The pulsation component of the induction voltage consequently becomes the torque pulsation component and furthermore the rotational pulsation, and it influences the motor drive system.

Figure 5A:
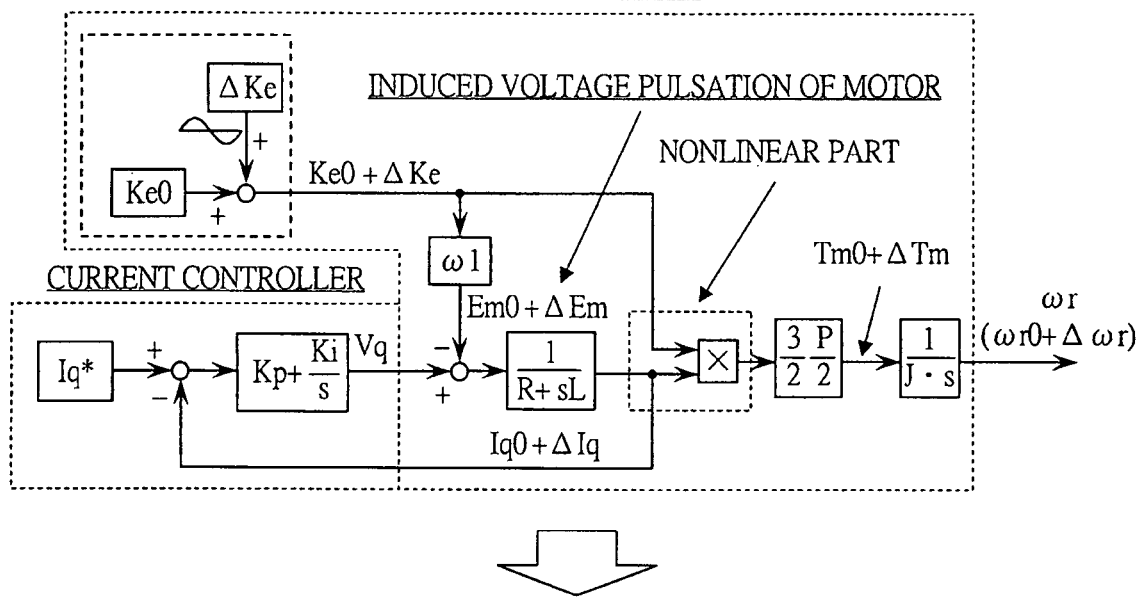
FIG. 5A is a view showing a generation principle of the torque pulsation in the motor drive system according to the first embodiment of the control device for a synchronous motor of the present invention.

FIG. 5A is a block diagram showing the generation principle of the rotational pulsation. In the current controller, the q-axis current controller performs current control such that the actual Iq matches the torque current command Iq*. The difference between the output Vq of the current controller and the induction voltage Em is applied to the RL circuit of the motor, thereby generating the current Iq. Since Em here contains pulsation component ΔEm, pulsation component ΔIq is also generated in the current Iq.

The generated torque Tm of the motor is the product of the power generation constant (magnet magnetic flux) and the torque current, and is represented by Equation 4

$$Tm = (3/2)(P/2)Ke \times Iq \quad \text{(Eq. 4)}$$

where P is the number of poles of the synchronous motor. Ke and Iq of the above equation respectively contains the pulsation component, and as a result, it becomes as represented by Equation 5

$$Tm = Tm0 + \Delta Tm \quad \text{(Eq. 5)}$$

where Tm0 is the average value of the generated torque and ΔTm is the pulsation component of the generated torque. Ultimately, the rotational pulsation Δωr is generated by the influence of the torque pulsation component, thereby becoming the factor of vibration, noise and degradation of wow and flutter. The present embodiment aims to suppress ΔTm, which is the source of the pulsation component.

When substituting (Eq. 2) and (Eq. 3) to (Eq. 4), Equation 6 is obtained.

$$Tm = (3/2)(P/2)(Ke0 + \Delta Ke)(Iq0 + \Delta Iq) \quad \text{(Eq. 6)}$$
$$= (3/2)(P/2)\{Ke0 \cdot Iq0 + Iq0 \cdot \Delta Ke + Ke0 \cdot \Delta Iq + \Delta Iq \cdot \Delta Ke\}$$

The first term in the right-hand side of the above equation is the basic component of the torque, and the second and third terms are dominant as torque pulsation components. The fourth term in the right-hand side is minute and thus is negligible.

Figure 5B:
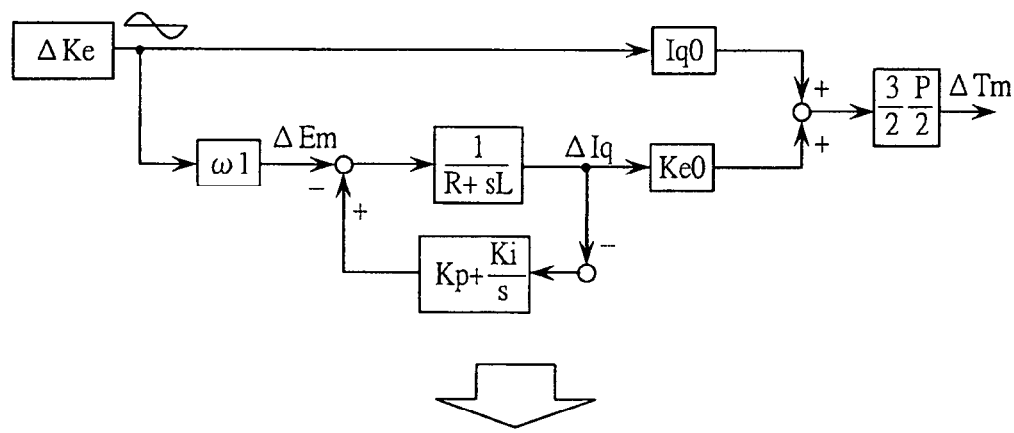
FIG. 5B is a view showing a generation principle of the torque pulsation in the motor drive system according to the first embodiment of the control device for a synchronous motor of the present invention.
Figure 5C:
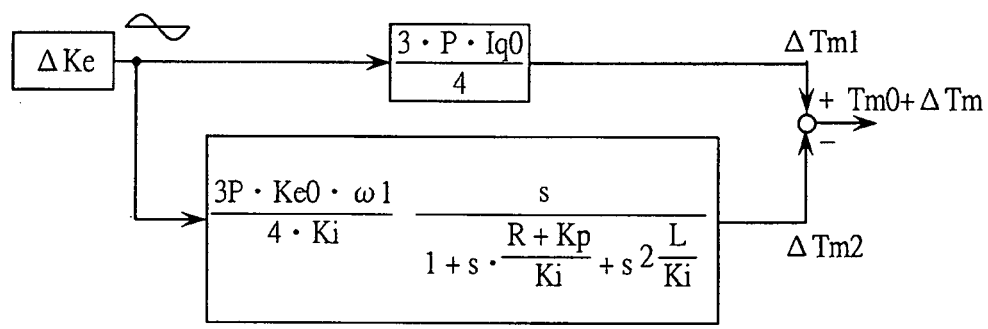
FIG. 5C is a view showing a generation principle of the torque pulsation in the motor drive system according to the first embodiment of the control device for a synchronous motor of the present invention.

According to (Eq. 6), FIG. 5B is obtained by linearizing FIG. 5A and rewriting to a block diagram with respect to the pulsation component ΔKe of the power generation constant. FIG. 5C can be obtained through the equivalent conversion. The torque pulsation ΔTm is represented by Equation 7

$$\Delta Tm = \Delta Tm1 - \Delta Tm2 \quad \text{(Eq. 7)}$$

where ΔTm1 and ΔTm2 are respectively represented by Equation 8 and Equation 9.

$$\Delta Tm1 = (3 \cdot P \cdot Iq0 / 4) \cdot \Delta Ke \quad \text{(Eq. 8)}$$

$$\Delta Tm2 = \frac{3 \cdot P \cdot Ke0 \cdot \omega 1}{4 \cdot Ki} \cdot \frac{s}{1 + s \cdot \frac{R + Kp}{Ki} + s^2 \frac{L}{Ki}} \cdot \Delta Ke \quad \text{(Eq. 9)}$$

ΔTm1 is the component of the same phase as the ΔKe. Furthermore, ΔTm2 is the quadratic transfer function, and the gain and the phase property are changed by the current control gains of Kp and Ki. Therefore, the synthetic component of ΔTm1 and ΔTm2 is canceled if appropriately adjusting Kp and Ki which are the current control gains so as to match the gain and phase property of (Eq. 9) to that of (Eq. 8).

Figure 6A:
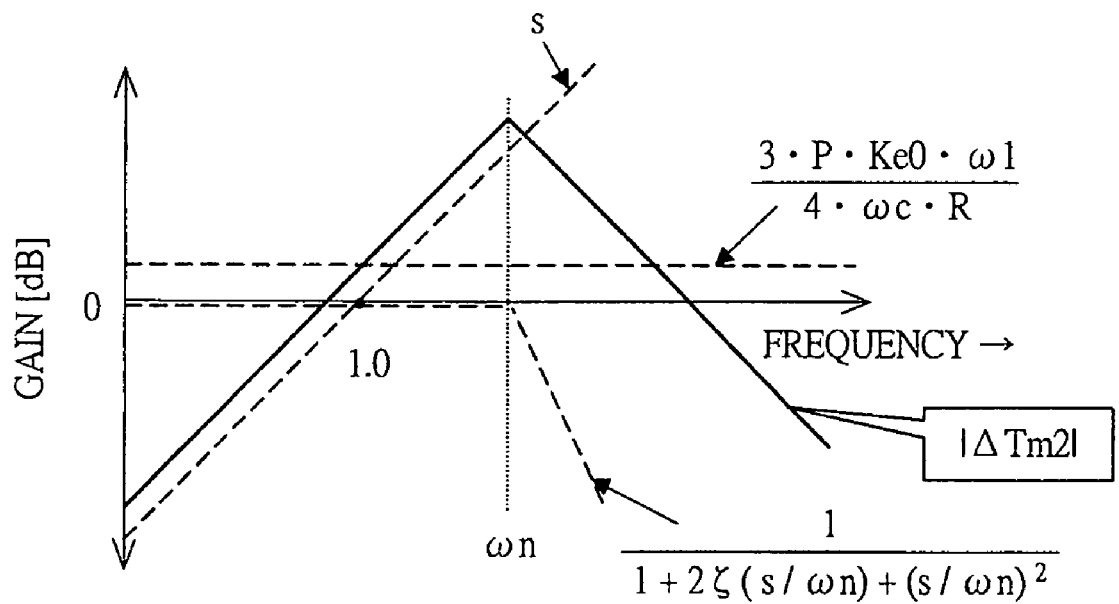
FIG. 6A is a view showing a frequency property of a torque pulsation $\Delta Tm2$ in the motor drive system according to the first embodiment of the control device for a synchronous motor of the present invention.

The gain and phase properties (frequency response property) of (Eq. 9) are shown in FIG. 6.

(Eq. 9) can be factorized into the secondary delay element, differentiation element, and proportional element, the sum of which becomes the gain property having a peak at natural frequency ωn. The phase property in time of peak is "zero degrees," and thus if pulsation component of ωn exists in ΔKe, the pulsation component is canceled out in terms of torque pulsation.

According to such feature, the torque pulsation can be suppressed by adjusting the current control gain such that the frequency of the pulsation component becomes ωn.

The secondary element in (Eq. 9) is represented by Equation 10.

$$G2 = \frac{1}{1 + s \cdot \frac{R + Kp}{Ki} + s^2 \frac{L}{Ki}} \quad \text{(Eq. 10)}$$

To realize the suppression, this equation is compared with the following Equation 11, which is the quadratic general equation, and the phase is set to zero degrees.

$$G = \frac{1}{1 + 2\zeta \frac{s}{\omega n} + \left(\frac{s}{\omega n}\right)^2} \quad \text{(Eq. 11)}$$

To this end, it is realized if Equation 12 is satisfied.

$$(s/\omega n)^2 = s^2(L/Ki) \therefore Ki = \omega n^2 \cdot L \quad \text{(Eq. 12)}$$

A block to embody (Eq. 12) is the integral gain setting unit 19 in FIG. 1. Thus, the torque pulsation Tm is minimized by adjusting the integral gain Ki with the frequency of the pulsation component contained in the power generation constant Ke as ωn.

Figure 6B:
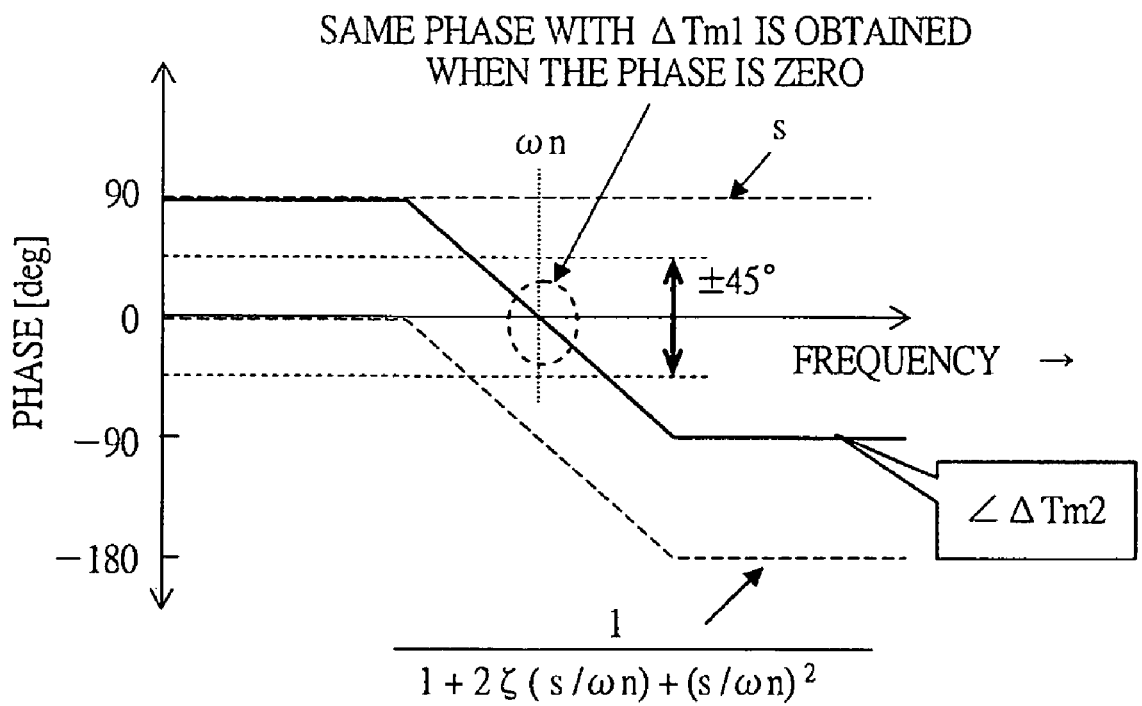
FIG. 6B is a view showing a frequency property of the torque pulsation $\Delta Tm2$ in the motor drive system according to the first embodiment of the control device for a synchronous motor of the present invention.

Ki is not necessary to exactly match (Eq. 12), and the phase of ΔTm2 becomes close to that of ΔTm1 as long as the relationship of (Eq. 12) is satisfied, thereby canceling out each other. Assuming that the pulsation component of Ke is disturbance, the results can be expected if the phase property is within the range of about ±45 degrees (FIG. 6B).

According to the present embodiment, the torque pulsation is suppressed to the minimum by adjusting the phase property of the current controller so as to be within the range of ±45 degrees with respect to the harmonic to be suppressed. Consequently, the torque pulsation and the rotational pulsation of the motor drive system are suppressed with the simplest configuration. The wow and flutter of the hard disc and the optical disc thereby is improved, and so lower noise and higher density of the recording density are realized.

In the present embodiment, a method of reproducing the phase current of the motor in the current reproducer 10 from the detected current of the one-shunt current detector 7 has been described, but also a means for directly detecting the phase current may be used.

Second Embodiment

A motor drive system according to a second embodiment of the control device for a synchronous motor of the present invention will be described with reference to FIG. 7.

Figure 7:
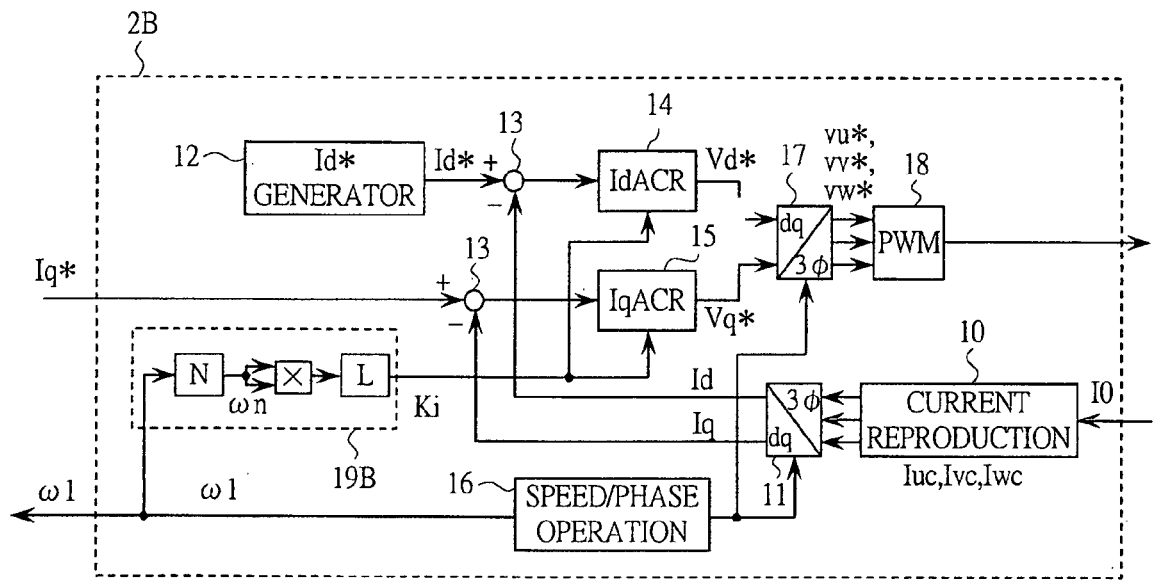
FIG. 7 is a view substantively showing a configuration of a controller in a motor drive system according to a second embodiment of the control device for a synchronous motor of the present invention.

FIG. 7 shows a configuration of a controller in the motor drive system of the present embodiment.

In the present embodiment, a control device for a synchronous motor 2B is used in place of the controller 2 of FIG. 1 to realize the motor drive system.

In FIG. 7, reference numerals 10 to 18 indicate the components same as those in FIG. 1. The major difference with FIG. 1 is in the difference in the operation of the integral gain setting unit 19B.

In the first embodiment of FIG. 1, the integral gain Ki is determined with respect to the set value of ωn. Thus, the set value must be changed when the pulsation frequency is changed. The actual pulsation component of the motor becomes the component of twice or six times as high as the driving frequency of the motor, and thus the value of ωn changes when adjustable-speed drive is performed.

Consequently, in the integral gain setting unit 19B, a function of adjusting Ki with a function of the driving frequency ω1 is provided to constantly suppress the harmonic wave of a predetermined number of order.

Ki is represented by Equation 13

$$Ki = (\omega 1 \cdot N)^2 \cdot L \quad \text{(Eq. 13)}$$

where N is an arbitrary integer.

The harmonic component of a specific order (Nth order) can always be suppressed even if the driving frequency is changed by operating (Eq. 13) in the integral gain setting unit 19B. In particular, significant effect is obtained by setting the N to the value of about 2nd to 6th order in suppressing harmonic wave of power generation constant.

Third Embodiment

A motor drive system according to a third embodiment of the control device for a synchronous motor of the present invention will be described with reference to FIG. 8 and FIG. 9.

Figure 8:
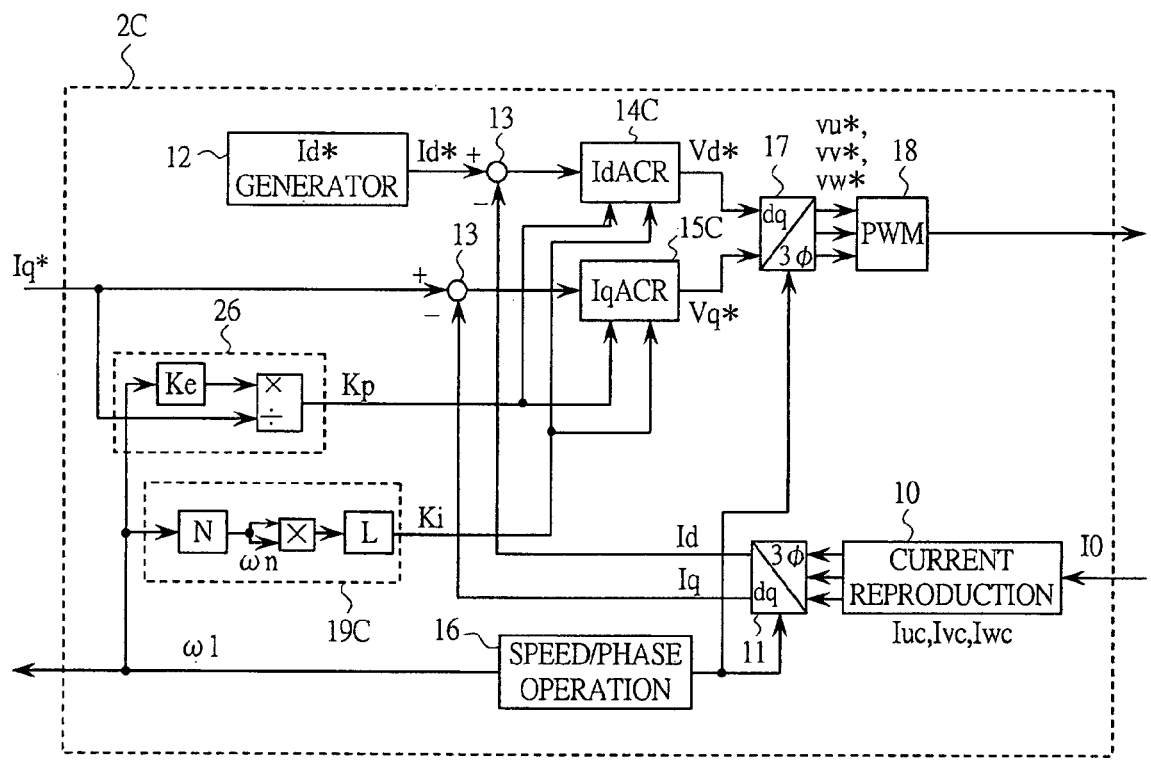
FIG. 8 is a view showing a configuration of a controller generator in the motor drive system according to a third embodiment of the control device for a synchronous motor of the present invention.

FIG. 8 shows a configuration of a controller in the motor drive system of the present embodiment.

In the present embodiment, the control device for a synchronous motor 2C is used in place of the controller 2 of FIG. 1 to realize the motor drive system.

In FIG. 8, reference numerals 10 to 13, 16 to 18, and 19C indicate the components same as those in FIGS. 1 and 7. The major difference with FIG. 1 and FIG. 7 lies in that a proportional gain setting unit 26 is newly added, and the configuration of the d-axis current controller 14C and the q-axis current controller 15C is modified.

Figure 9:
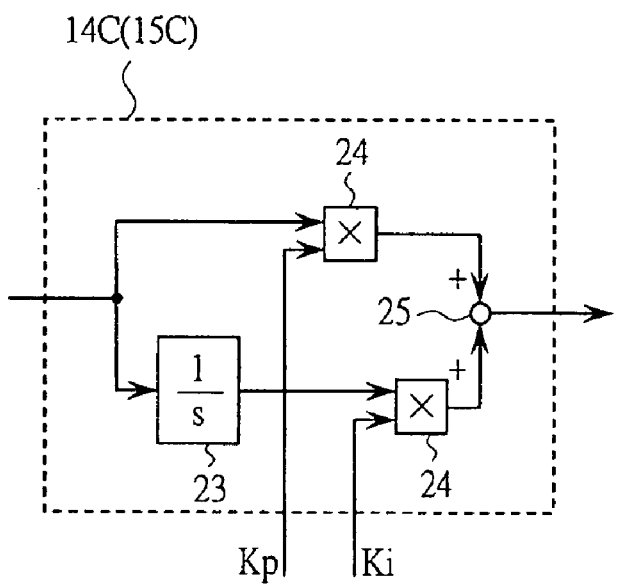
FIG. 9 is a view showing a configuration of a current controller generator in the motor drive system according to a third embodiment of the control device for a synchronous motor of the present invention.

The d-axis current controller 14C (as well as the q-axis current controller 15C) has the configuration shown in FIG. 9. In FIG. 9, reference numerals 23 to 25 are the same as those in FIG. 3.

A feature of the current controller in FIG. 9 lies in that the gain Kp is externally set for the proportional control in addition to the integral control.

The phases of ΔTm1 and ΔTm2 are aligned to minimize the overall torque pulsation ΔTm in the first and second embodiments, but in the present embodiment, ΔTm1 and ΔTm2 are matched in terms of amplitude to further suppress ΔTm.

From (Eq. 8), the size of ΔTm1 is represented by Equation 14.

$$|\Delta Tm1| = (3 \cdot P \cdot Iq0/4)|\Delta Ke| \quad \text{(Eq. 14)}$$

The amplitude of ΔTm2 is obtained by substituting (Eq. 12) and s=jωn to (Eq. 9). Then, Equation 15 is obtained.

$$\Delta Tm2 = \frac{3 \cdot P \cdot Ke0 \cdot \omega 1}{4 \cdot Ki} \cdot \frac{j\omega n}{1 + j\omega n \cdot \frac{R + Kp}{Ki} - \omega n^2 \frac{L}{\omega n^2 L}} \cdot \Delta Ke \quad \text{(Eq. 15)}$$

$$= \frac{3 \cdot P \cdot Ke0 \cdot \omega 1}{4 \cdot Ki} \cdot \frac{j\omega n}{j\omega n \cdot \frac{R + Kp}{Ki}} \cdot \Delta Ke$$

$$= \frac{3 \cdot P \cdot Ke0 \cdot \omega 1}{4 \cdot Ki} \cdot \frac{Ki}{R + Kp} \cdot \Delta Ke$$

$$= \frac{3 \cdot P \cdot Ke0 \cdot \omega 1}{4} \cdot \frac{1}{R + Kp} \cdot \Delta Ke$$

Normally R<<Kp is satisfied and thus (Eq. 15) is approximated to Equation 16.

$$\Delta Tm2 = \{(3 \cdot P \cdot Ke0 \cdot \omega 1)/(4 \cdot Kp)\} \Delta Ke \quad \text{(Eq. 16)}$$

Accordingly, the amplitude is represented by Equation 17.

$$|\Delta Tm2| = \{(3 \cdot P \cdot Ke0 \cdot \omega 1)/(4 \cdot Kp)\} \Delta Ke| \quad \text{(Eq. 17)}$$

From (Eq. 14) and (Eq. 17), the condition where $\Delta Tm1$ and $\Delta Tm2$ match is represented by Equation 18.

$$Kp = Ke0 \cdot \omega 1 / Iq0 \quad \text{(Eq. 18)}$$

The method of setting proportional gain is embodied as the proportional gain setting unit 26 in FIG. 8. Command Iq* may be used while Iq0 is the average value of the torque current.

The phase and amplitude of $\Delta Tm1$, $\Delta Tm2$ match through the use of the controller 2C of FIG. 8, and in principle, $\Delta Tm$ is completely eliminated. According to the present embodiment, the influence of the pulsation component contained in the power generation constant Ke can be completely eliminated.

Instability may occur since Kp changes in proportion to the current command Iq*. Thus, Kp may be let to gradually change through the filter or may be fixed to the current value that is the most averagely used. If there is no load, Iq* becomes zero and Kp becomes infinite. To prevent this, the lower limit value may be set.

Fourth Embodiment

The motor drive system according to a fourth embodiment of the control device for a synchronous motor of the present invention will now be described with reference to FIG. 10.

Figure 10:
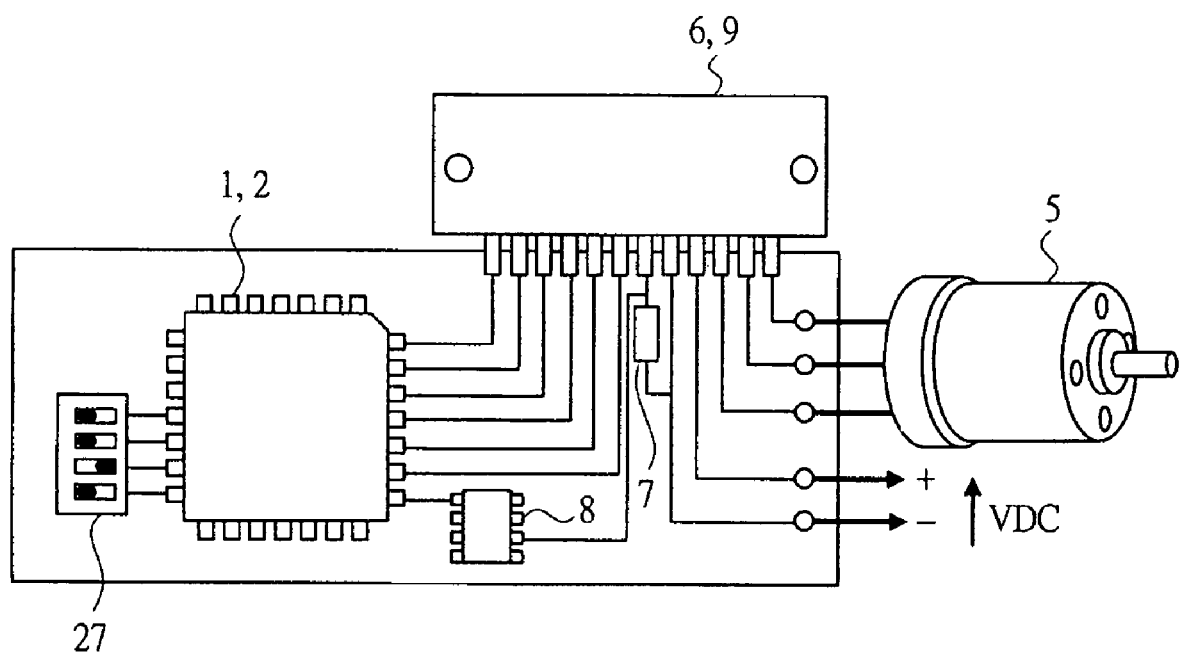
FIG. 10 is a view realistically showing a configuration of a controller in the motor drive system according to a fourth embodiment of the control device for a synchronous motor of the present invention.

FIG. 10 shows a configuration of the motor drive system of the present embodiment (correspond to first embodiment of FIG. 1) realistically.

In FIG. 10, the Iq* generator 1 and controller 2 are realized with one integrated circuit (integrated circuit (IC)), and the inverter is driven by the PWM pulse waveform output from the integrated circuit. The inverter portion is integrated with the inverter main circuit unit 6 and the output pre-driver 9 (one package), and thus miniaturization is realized. The inverter current is detected by the one-shunt current detector 7, and the current is sample-held by the sample holder 8 and read by the controller 2.

The characterizing portion of the present embodiment is a suppressing harmonic setting switch 27 which is newly added. The switch sets how many times to multiple the fundamental frequency to get the harmonic wave to delete. As represented in (Eq. 13), the pulsation component an is expressed as $\omega 1 \times N$, where "N" is set by the suppressing harmonic setting switch 27. After the setting, the pulsation component can be suppressed similarly to the first to the third embodiments.

Although an example of a dip switch is shown for the suppressing harmonic setting switch 27 in FIG. 10, other switches or volume and the like may be used.

Fifth Embodiment

A motor drive system according to a fifth embodiment of the control device for a synchronous motor of the present invention will be described with reference to FIG. 11.

FIG. 11 shows a configuration of the motor drive system of the present embodiment realistically.

FIG. 11 substantially has the same configuration as FIG. 10, but an external connecting terminal 28 is arranged in place of the suppressing harmonic setting switch 27 of FIG. 10. The external connecting terminal 28 is connected with a personal computer 29 through serial communication, and the suppressing component of the harmonic wave is set from the personal computer 29. For example, optimization can be achieved by changing the setting for motors having different properties such as a motor with large secondary pulsation or a motor with large sixth pulsation. Since the switch is not necessary to be arranged on the board, an advantage of achieving miniaturization in device assembling is obtained.

Radio transmission etc. may be introduced for the communication method. The device to perform the setting may be terminals other than personal computers, and remote controllers and the like.

The Iq* generator 1 and the controller 2 of the fourth embodiment and the present embodiment are realized by using not only the specific integrated circuit, but also general-purpose processors such as microcomputer and DSP or FPGA.

Sixth Embodiment

A motor drive system according to a sixth embodiment of the control device for a synchronous motor in the present invention will be described with reference to FIG. 12.

FIG. 12 shows a configuration of the motor drive system of the present embodiment realistically.

In FIG. 12, the Iq* generator 1, the controller 2, and the inverter 3 are realized in one chip. In the present embodiment, adjustable-speed drive of the synchronous motor 5 can be realized if the synchronous motor 5 is connected to the DC power supply. The entire system can be miniaturized when driving a compact synchronous motor.

If the control portions such as the Iq* generator 1, the controller 2 and the like are on the integrated circuit, high-speed operation in which the operation speed is less than or equal to several or several tens of μs becomes possible. To practice the present embodiment, the upper limit of the integral gain Ki (or proportional gain Kp) is defined by the operation speed, and thus high-speed operation process is required for the faster rotation frequency. Making the operation processing speed faster is difficult when microcomputer or DSP is used for control, but this problem is significantly improved by having the control section in a specific integrated circuit, and the effects of the present embodiment become significant.

For example, in the case where the motor is rotating at 15000 r/min and the number of poles is eight, the driving frequency of the motor is 1 kHz. In this case, the sixth pulsation is 6 kHz and whose period is about 167 μs. In order to suppress such frequency component, it is required to drive at a short sample period of about ⅓ to ⅕, and thus sufficient effects are obtained in the present embodiment if the period of operation processing less than or equal to 40 μs can be realized.

All of the embodiments described above are applicable regardless of the presence of the rotation position sensor (sensor-equipped, sensor-less) of the synchronous motor.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention relates to a control technology of a synchronous motor, in particular, to a rotation control technology of motor drive devices and integrated-circuit devices for driving motors, for example, spindle motors of HDD, optical disc drives and the like.

What is claimed is:

1. A control device for a synchronous motor comprising: a synchronous motor; a load device connected to the synchronous motor; an inverter for applying a voltage with modulated pulse width to the synchronous motor and driving the synchronous motor with an alternating current; a power supply for supplying power to the inverter; and a controller including a detector unit that detects at least one of current flowing to the synchronous motor or current supplied to the inverter and adjusting voltage output from the inverter based on a detected current value, wherein the controller comprises a proportional-integral controller having an integral gain Ki, wherein $\omega 1$ is a driving electric angular frequency of the synchronous motor, N is an arbitrary integer, and the integral gain Ki is adjusted as functions of $\omega 1$ and N in accordance with $Ki=(\omega 1 \cdot N)^2 \cdot L$, where L is an inductance of the synchronous motor, wherein the controller has a phase property in which a disturbance response property of the controller is within ±45 degrees.

2. The control device for a synchronous motor according to claim 1, wherein N is and integer ranging from 2 to 6.

3. A control device for a synchronous motor comprising: a synchronous motor; a load device connected to the synchronous motor; an inverter for applying a voltage with modulated pulse width to the synchronous motor and driving the synchronous motor with an alternating current; a power supply for supplying power to the inverter; and a controller including a detector that detects at least one of current flowing to the synchronous motor or current supplied to the inverter and adjusting voltage output from the inverter based on a detected current value;

wherein a proportional-integral controller is used for the controller, and an integral gain Ki of the proportional-integral controller is adjusted according to (Eq. 1)

$$Ki=(\omega 1 \cdot N)^2 L \quad \text{(Eq. 1)}$$

where $\omega 1$ is a driving electric angular frequency of the synchronous motor, L is an inductance of the synchronous motor, and N is an arbitrary integer.

4. The control device for a synchronous motor according to claim 3, wherein N is an integer ranging from 2 to 6.

5. The control device for a synchronous motor according to claim 3 or 4 comprising, as to a proportional gain of the proportional-integral controller used for the controller, at least one of a circuit that takes the proportional gain as a function of the electric angular frequency of the AC applied to the synchronous motor and a circuit that takes the proportional gain as a function of a driving current.

6. The control device for a synchronous motor according to claim 3, wherein the controller includes an external connecting terminal and has a function capable of freely adjusting the integral gain by directly operating the external connecting terminal or inputting a communication signal to the controller externally.

7. The control device for a synchronous motor according to claim 1 or 3, wherein the controller is configured using an integrated circuit device, and an operation processing time of the integrated circuit device is less than or equal to 40 μs.

8. The control device for a synchronous motor according to claim 1 or 3, wherein the inverter and the controller are formed on the same semiconductor substrate.

* * * * *

UNITED STATES PATENT AND TRADEMARK OFFICE
CERTIFICATE OF CORRECTION

| | | |
|---|---|---|
| PATENT NO. | : 7,859,209 B2 | Page 1 of 1 |
| APPLICATION NO. | : 11/895406 | |
| DATED | : December 28, 2010 | |
| INVENTOR(S) | : Yoshitaka Iwaji et al. | |

It is certified that error appears in the above-identified patent and that said Letters Patent is hereby corrected as shown below:

Claims:

In Claim 2, Column 11, line 41 as indicated below:

"wherein N is and integer ranging from 2 to 6."

should read,

-- wherein N is an integer ranging from 2 to 6. --

Signed and Sealed this
Eighth Day of March, 2011

David J. Kappos
*Director of the United States Patent and Trademark Office*